(12) United States Patent
Ataee

(10) Patent No.: US 6,566,832 B2
(45) Date of Patent: May 20, 2003

(54) METHOD AND APPARATUS FOR PARKING A READ/WRITE HEAD DURING POWER INTERRUPTIONS BY DYNAMIC SEQUENCING

(75) Inventor: Mehran Ataee, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/849,321

(22) Filed: May 4, 2001

(65) Prior Publication Data

US 2002/0006007 A1 Jan. 17, 2002

Related U.S. Application Data

(63) Continuation-in-part of application No. 09/324,577, filed on Jun. 2, 1999, now abandoned.

(51) Int. Cl.$^7$ .............................................. G05B 11/01
(52) U.S. Cl. ................ 318/560; 318/568.16; 318/453; 318/459; 360/75; 360/290
(58) Field of Search ................................. 318/560, 430, 318/568.16, 445, 450, 453, 459; 360/75, 256.1, 256, 256.3, 290

(56) References Cited

U.S. PATENT DOCUMENTS

| | | | |
|---|---|---|---|
| 4,311,948 A | 1/1982 | Brown et al. ............... 318/759 |
| 4,658,308 A | 4/1987 | Sanders, Jr. ............... 360/74.1 |
| 4,679,102 A | * 7/1987 | Wevers et al. ............. 360/75 |
| 4,692,829 A | 9/1987 | Campbell .................. 360/105 |
| 4,831,469 A | 5/1989 | Hanson et al. ............. 360/75 |
| 4,866,554 A | 9/1989 | Stupeck et al. ............. 360/105 |
| 5,091,680 A | 2/1992 | Palm .......................... 318/368 |
| 5,319,511 A | 6/1994 | Lin ............................. 360/105 |
| 5,455,496 A | 10/1995 | Williams et al. ............ 318/563 |
| 5,473,238 A | 12/1995 | Latham, II et al. ......... 318/560 |
| 5,486,957 A | 1/1996 | Albrecht ...................... 360/75 |
| 5,495,156 A | 2/1996 | Wilson et al. .............. 318/368 |
| 5,600,217 A | 2/1997 | Bartlett ....................... 318/434 |
| 5,602,700 A | 2/1997 | Viskochil et al. ........... 360/105 |
| 5,729,399 A | 3/1998 | Albrecht ..................... 360/754 |
| 5,737,144 A | 4/1998 | Ataee ......................... 360/75 |
| 5,872,670 A | 2/1999 | Ataee ......................... 360/69 |
| 5,889,629 A | * 3/1999 | Patton, III .................. 360/75 |
| 5,999,370 A | 12/1999 | Stone et al. ................ 360/105 |
| 6,025,968 A | 2/2000 | Albrecht ..................... 360/75 |

* cited by examiner

Primary Examiner—Robert E. Nappi
Assistant Examiner—Rina I. Duda

(57) ABSTRACT

An apparatus for parking a read/write head during power interruptions and methods of operating the same result in a hard disk drive apparatus that reduces the time to steady state the operating hard disk drive. The apparatus for reducing the time to steady state the operating disk drive having an actuator arm coupled to a voice coil for latching the actuator arm when power is interrupted comprises a Y-winding spindle motor having a first winding, a second winding, and a third-winding, and a spindle motor controller coupled to the Y-winding spindle motor configured to dynamically short the first winding and the second windings to produce a retarding force against the Y-winding motor and to direct power produced by the third winding in series with the first two windings in parallel to the voice coil for moving the actuator arm to a latched position and to maintain sufficient power to the spindle motor to provide greater operating range (headroom).

62 Claims, 10 Drawing Sheets

METHOD AND APPARATUS FOR PARKING A READ/WRITE HEAD DURING POWER INTERRUPTIONS BY DYNAMIC SEQUENCING

RELATED APPLICATIONS

This is a Continuation-In-Part U.S. patent application Ser. No. 09/324,577 filed on Jun. 2, 1999 now Abandoned for "Method and Apparatus for Parking a Read/Write Head During Power Interruptions", now pending.

FIELD OF THE INVENTION

The present invention relates to parking a read/write head of a head and disk assembly (HDA) to a landing zone and more particularly to reducing the time associated with parking the head/write head when power is removed from the HDA.

BACKGROUND OF THE INVENTION

Magnetic disk drive systems have become widely accepted in the computer industry as a cost effective form of data storage. In a magnetic disk drive system, a magnetic disk rotates at high speed while a magnetic read/write head flies slightly over the surface of the rotating disk. The magnetic disk is a carried by a spindle motor. The read/write head is suspended over the disk on a support arm. As the disk rotates at high speed, the aerodymanic properties of the read/write head provide a lifting force which floats the head over the disk surface on a cushion of air.

Two of the most critical periods in determining the read/write head life span occur during take off and landing. Prior to operation, the read/write head rests on an inner track or landing zone where the head is parked. As the disk begins to rotate from an initial, stopped position, the read/write head is dragged along the surface of the disk. Once the disk reaches sufficient speed, the aerodynamic lift floats the read/write head assembly away from the disk surface.

During shutdown of the disk drive system, the read/write head must land upon the surface of the magnetic disk. This landing typically occurs in the landing zone along the inner radius of the magnetic disk surface. After power to the magnetic disk drive spindle motor is shut-off, momentum continues to carry the magnetic disk through its rotation. Various friction sources slowly reduce the speed of rotation of the magnetic disk. As the disk rotation slows, the aerodynamic lifting force is reduced and the read/write head assembly contacts the disk surface in the landing zone area. Once the magnetic head contacts the disk surface, the head is dragged across the surface as momentum continues the magnetic disk rotation.

Magnetic read/write heads used in modern day disk drive systems are typically extremely small and delicate made of magneto-resistive heads and giant magneto-resistive heads. The dragging associated with take offs and particularly with landings is a primary source of wear for the read/write heads. Prior art have attempted to limit the length of the dragging by braking the rotation of the spindle motor. The solutions include circuitry for electrically shorting out the windings in a magnetic disk drive spindle motor following a predetermined time delay after power loss and retraction of the magnetic read/write head onto the landing zone area of the disk surface. Electrically shorting the coils causes the spindle motor to rapidly stop rotating.

Other prior art approaches to disk drive braking have used mechanical devices such as normally closed electric relays held in the open position by the power supply in the magnetic storage system. Upon loss of power, these relays return to their closed positions and electrically short out the spindle motor windings to brake the spindle motor. Mechanical relays have a number of drawbacks including additional constant power draw, large size, high cost and other inherent reliability limitations problematic of electro-mechanical components.

Another prior art approach includes the use of an aerodynamic actuator latch as disclosed in commonly assigned U.S. Pat. No. 5,319,511 titled "Aerodynamic Actuator Latch with Magnetic Return Spring for Hard Disk Drive". The disclosure of the referenced patent is incorporated herein by this reference. The aerodynamic actuator latch system (or airlock) locks a rotary actuator assembly of a disk drive to restrain a data transducer at the landing zone during non-rotation of the disks and for releasing the latch in response to airflow generated by disk rotation. However, during power down, until the actuator latch system locks and the spindle motor stops rotating or reaches very low RPM, the data transducer may still be subjected to damage.

A recent trend has been to use hard disk drives as portable storage elements. Hard disk drive enclosures have been developed with removable slide mounts which enable the hard disk drives to be easily removed from a computer system. Moreover, some removable slide mounts feature hot swappable characteristics that allow the hard drives to be removed while the hard disk and the computer system are still operating. Hard disk drives used in such removable systems are often subjected to movement before the read/write heads have had a chance to be placed over the landing zone.

Therefore, it is desirable to provide an apparatus and methods of operating the same which parks a read/write head during power interruptions that overcomes the drawbacks of prior art solutions.

SUMMARY OF THE INVENTION

The present invention provides an apparatus for parking a read/write head during power interruptions and methods for operating the same which improves the time to park a read/write head. The novel improved apparatus is based on supplying power to retract circuitry while braking the spindle motor at the same time. Thus, according to one aspect of the invention, the apparatus for reducing the time to steady state an operating disk having an actuator arm coupled to a voice coil for latching the actuator arm when power is interrupted:, comprises a Y-winding spindle motor having a first winding, a second winding, and a third winding, and a spindle motor controller coupled to the Y-winding spindle motor configured to short the first winding and the second winding to produce a retarding force against the Y-winding spindle motor and to direct power produced by the third winding in series with the parallel combination of the first and second windings, to the voice coil for moving the actuator arm to a latched position using BEMF dynamically modulating vectors.

According to another aspect of the invention, the spindle motor controller shorts the first winding and the second winding in parallel to produce the retarding force. The spindle motor controller serially couples the third winding to the parallel combination of the first and second windings, and to the voice coil. Supplying power to the voice coil retracts the actuator arm which includes at least one read/write head to a landing zone area. Said combination of the windings provides more power for a longer duration.

According to another aspect of the invention, the first winding includes a first switch, the second winding includes a second switch, and the third winding includes a third switch and the spindle motor controller couples the first switch of the first winding with the second switch of the second winding and couples the third switch of the third winding to the voice coil. The first switch can include a first spindle MOSFET driver, the second switch can include a second spindle MOSFET driver, and the third switch can include a third spindle MOSFET driver.

According to another aspect of the invention, the latched position includes a parked position for the actuator arm. With the actuator arm in the latched position, the read/write heads remain secured to facilitate transport of the drive apparatus without damaging the read/write heads due to shorter stop time and less wear and tear.

According to yet another aspect of the invention, a power isolation switch is coupled to a power supply and wherein the spindle motor controller opens the power isolation switch when the power is interrupted. Isolating the power supply from generated back EMF via the windings of the spindle motor prevents leakage of power through the interrupted power supply.

An apparatus and method for parking a read/write head for a disk drive are provided by supplying back EMF to a retract circuitry and generating back EMF to brake the spindle motor. The time needed to park a read/write head and steady state the disk drive is reduced when power is removed. Disk drives can be moved sooner without the risk of damaging the read/write heads or the spindle motor bearings. The disk drives are ultimately more reliable and are less prone to data transfer errors. Particularly in removable applications where slidable disk drive mounts allows for quick swapping of disk drives. Accordingly, reducing the time to steady state an operating drive when power is interrupted is paramount to the longevity of disk drives.

Others aspects and advantages of the present invention can be seen upon review of the figures, the detailed description, and the claims which follow.

BRIEF DESCRIPTION OF THE DRAWING

These and other features, aspects and advantages of the present invention will become better understood with regard to the following description, appended claims and accompanying drawings where:

DETAILED DESCRIPTION OF THE INVENTION

Figure 1:
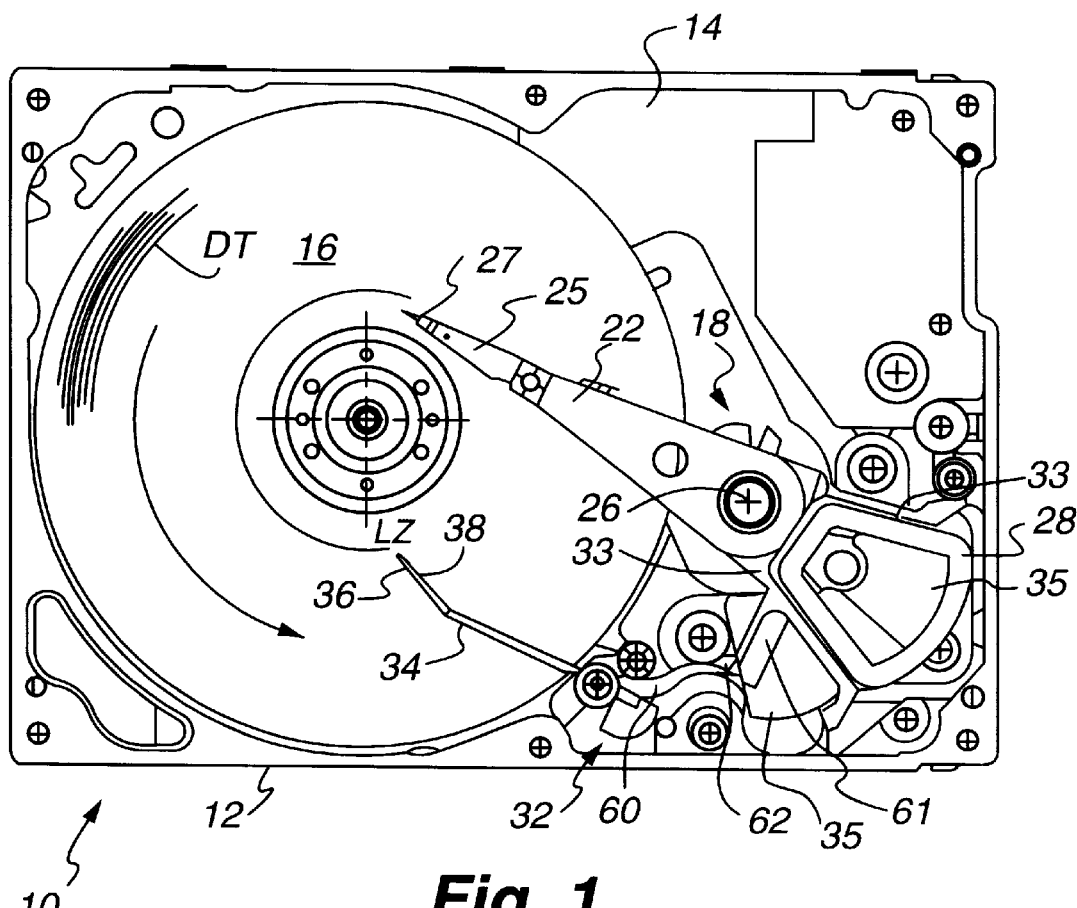
FIG. 1 illustrates a plan view of ahead and disk assembly having an aerodynamic latch member.

A head and disk assembly (HDA) 10 of a rigid rotating disk drive data storage device is depicted in FIG. 1. Therein, the assembly 10 is shown to include a sidewall portion 12 of a base casting or frame 14, two data storage disks 16, 17 which are commonly jounalled to the frame 14 via a direct drive spindle motor (not shown). One of the disks 16 and one head arm 22 are shown together in FIG. 1 plan view. The head arm 22 secures one end of, and positions, a load beam 25 to which a data read/write transducer head slider 27 is attached at the distal end. The slider 27 includes a data transducer head, most preferably formed as a magneto-resistive (mr) head, for example. The lead beam 25 is designed to act as a spring as well as a support, and it supplies a predetermined loading force on the head slider 27 to urge it toward the storage surface of the disk 16. This force is overcome by an air bearing generated by the rotation of the disks 16 and 17 during operations of the data storage subsystem of which the HDA 10 is an integral part. There are other head arms 22 and load beams in vertical alignment which which form a "head stack". The head stack is commonly mounted to a rotary voice coil actuator assemblyt 18. The assembly 18 is jounalled for rotation about an axis of rotation noted by a reference numeral 26. The actuator assembly 18 is movable through a range of limited angular displacement after an actuator lock has disengaged therefrom.

The rotary actuator assembly 18 is mounted to a shaft fixed to the frame 14 at the axis 26 by suitable bearings (not shown) so that the actuator assembly 18 is generally free to rotate along a locus of limited rotational displacement, thereby moving the head 27 from an outer region of the disk 16 to an inner region thereof, including a radially inwardmost landing zone LZ. Electronic circuitry, such as a read preamplifier/write driver and switch, and other related circuit elements including electrical connections extending to the data transducer head 27 are mounted to e.g. a flexible plastic film circuit substrate. An extension of substrate exits the interior space of the HDA 10 between an upper lip of the base sidewall and gasket sealing a cover (not shown) to the upper peripheral lip of the continuous sidewall 12. The cover enclosed and seals the interior space defined by the base 14 and sidewall 12 in order to keep the space free of contaminants otherwise interfering with flying operations of the slider 27 as is conventional in Winchester hard disk technology.

The actuator assembly 18 includes an actuator arm portion 61 which extends outwardly to face an outward end face of a stop arm portion 60 of an aerodynamically released actuator latch mechanism 32. Also included within the rotary actuator assembly 18 is a flat, generally wedge shaped actuator voice coil 28 (shown in out form in FIG. 1). The actuator voice coil 28, comprising a coil of insulated small gauge copper wire, is preferably formed into an integral coil structure by conventional plastic encapsulation/molding techniques. The coil structure body 28 is then attached to a somewhat V-shaped carrier structure 33 of the actuator structure by conventional bonding techniques. The flat voice coil 28 is positioned with in a magnetic gap having intense magnetic fields. The fields are established by e.g. plural high flux intensity permanent magnets. The magnets and resultant intense magnetic fields are such that current passing through the coil 28 in one direction causes rotation of the actuator assembly 18 in one radial direction relative to the disks 16 and 17 such as the radially outward "unlatch" direction, while reverse current causes reverse direction movement such as the radially inward "latch" direction. The high flux intensity magnets 35 may comprise ceramics of a magnetized rare earth element such as neodymium, for example.

The load beam 25 and its associated transducer head slider 27 are movable between the radially innermost landing zone LZ and a multiplicity of concentric tracks DT defined on the storage surface of the disks 16 and 17. To prevent damage to the data tracks when the transducers are not flying on an air bearing generated by the rotation of the disks 16, 17, it is established practice to restrain the transducers (read/write head) 27 at the landing zone LZ.

Figure 2:
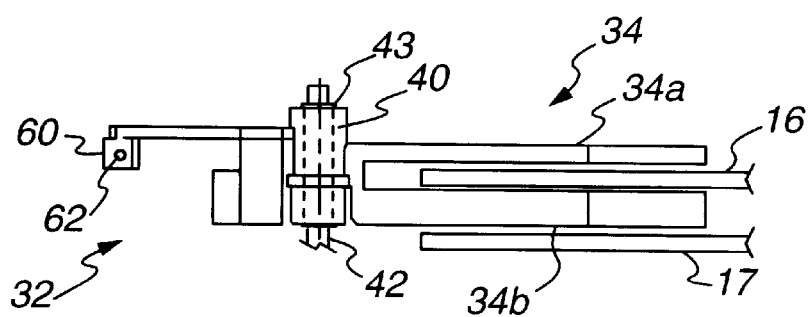
FIG. 2 illustrates a side view of an aerodynamic latching mechanism.

A fringe magnetic field provided by the permanent magnets 35 provided magnetic bias force to assist in operating the aerodynamically released latch mechanism 32. As is seen in FIG. 1, the latch mechanism 32 restraints the actuator 18 in a locked position to enable the sliders 27 to rest at the landing zone when the disks 16 and 17 are not rotating at their nominal spindle speed, e.g. 7200 PRM. Referring now to FIG. 2, and integrally molded aerodynamic latch body 32 is preferably formed of suitable injection molded plastic material. The body 32 includes a forked integral airvane portion 34 having a tine 34a which is disposed above the disk 16 and tine 34b which is vertically aligned with the tine 34a and located between the two disks 16, 17.

The airvane portion 34 extends almost to the inner hub region of the disk spindle so as to present a substantial vane surface to airflow generated by the disks 16, 17. The airvane portion 34 includes flat front and back surfaces 36 and 38. A central journal region 40 of the body 32 defines a vertical axial opening enabling the body 32 to be rotatably mounted to the frame 14 via a pin 42 is press-fit into a well formed to receive the pin. The body 32 is retained in place on the pin 42 by a suitable fastener such as slightly undersized washer 43 which is press-fit over the pin 42 and seated in and annular groove formed just below the top of the pin 42.

When the disks 16 and 17 are brought to their nominal operational rotation, e.g. 7200 RPM or faster, in a counter-clockwise direction as viewed in FIG. 1, the resultant airflow generated by disk rotation impinges upon the airvane portion 34 with sufficient force to cause the attraction force of the ferromagnetic slug 62 to the stray magnetic field adjacent the permanent magnets 35 to be overcome; and, the actuator body 32 thereupon rotates to an unlatched position. This radial displacement of the actuator latch body 32 disengages the stop arm portion 60 from the actuator arm portion 61, thereby enabling the actuator 18 to rotate freely between the outer edge of the disks and landing zone LZ. At the same time, the rotational movement of the body 32 causes the stop arm portion 60 to be displaced slightly away from the magnets 35 and results in a reduced magnetically induced bias force.

After power to the spindle motor is removed and the disks 16 and 17 are spinning down, the energy stored in the rotating disks is automatically supplied to the actuator coil 28 in a flow direction appropriate to cause the actuator to move in a direction toward the landing zone LZ. After this movement has occurred, airflow bias force drops as the disks spin down. As the airflow force becomes less than the fringe magnetic field, the ferromagnetic body 62 is caused to move toward the latched position and into engagement with the latch body 32. During pivoting of the body 32 to the latched position, the stop arm portion 60 passes by and clears a side surface of the end of the stop arm portion 60.

It will be appreciated that when the disks 16 and 17 are rotating in the counter-clockwise direction, the latch body 32 is pivoted such that it is opened or unlatched thereby allowing the actuator assembly 18 to move due to the aerodynamic force created by the spinning disks 16 and 17. However when the disk 16 and 17 are not spinning, the latch body 32 positively locks the actuator assembly 18 due to the magnetic attraction of the slug 62.

Figure 3:
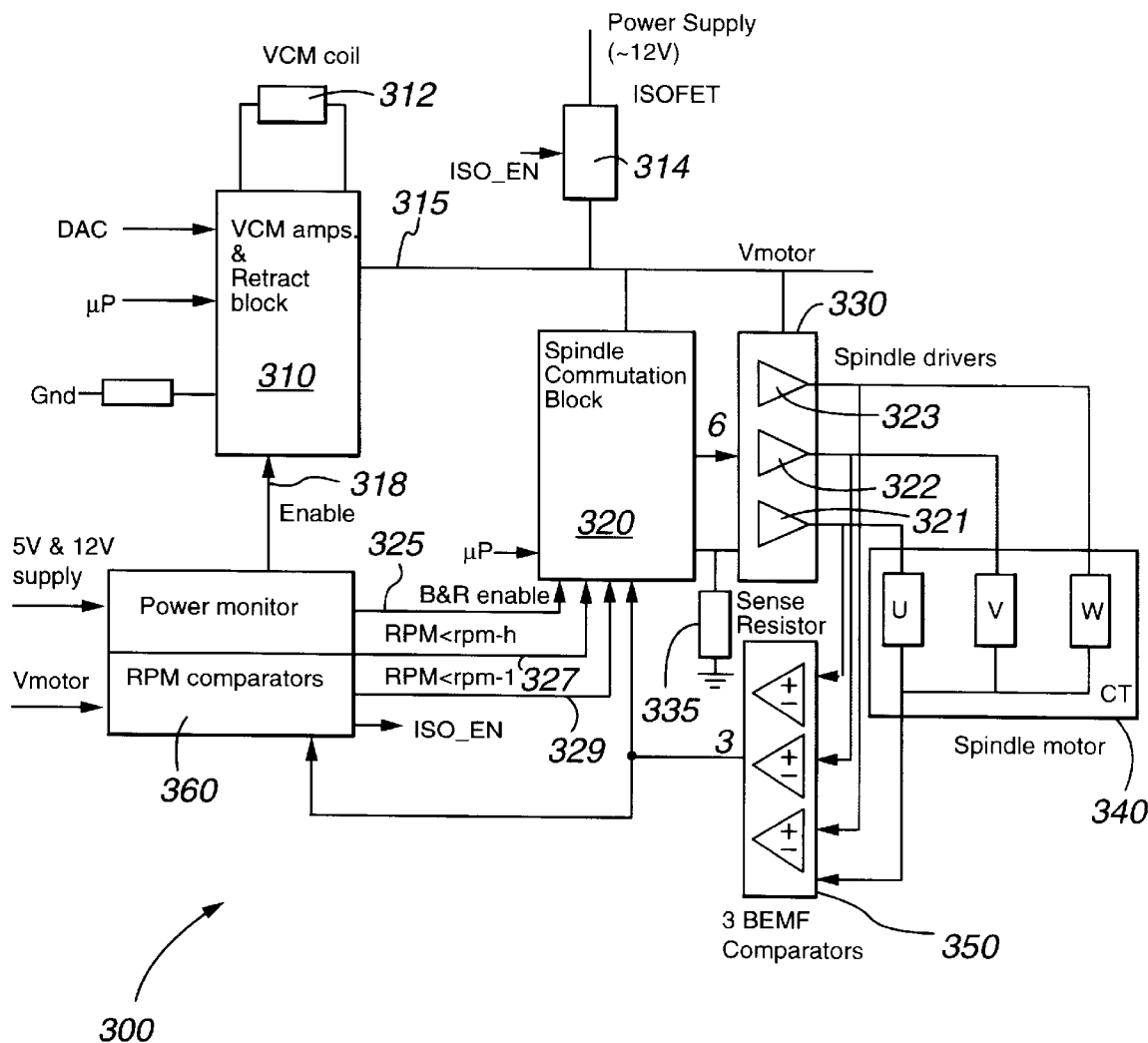
FIG. 3 illustrates a simplified block diagram of a parking and brake circuit in accordance with the present invention.

FIG. 3 illustrates a simplified block diagram of a parking and brake circuit 300 according to the present invention. The park and brake circuit 300 includes a VCM (voice coil motor) amplifier and retrace block 310, VCM coil 312, ISOFET switch 314, spindle commutation block 320, spindle drivers 330, Rsense resistor 335, spindle motor 340, BEMF (back electromotive force) comparators 350, and power monitor and RPM comparators 360. The ISOFET switch 314 includes a switch coupled to the 12 volt power supply. The ISO_EN signal controls ISOFET switch 314. According to the present invention, the ISOFET switch 314 could be or included back to back MOSFETs. The VCM amplifier and retract block 310 is coupled to the power monitor and RPM comparators 360, and the Vmotor line 315. The Vmotor line 315 supplies 12 volt power. The power monitor and RPM comparators 360 monitors system supplies 5 volt and 12 volts and enables the VCM amplifier and retrace block 310 when voltage are within a predetermined voltage range via enable line 318. The VCM amplifier and retract block 310 receives DAC (digital to analog converter) and microprocessor signals from control logic (not shown) to activate the VCM coil 312. The VCM 312 controls placement of the read/write head 27 to the multiplicity of concentric tracks DT.

The spindle commutation block 320 receives power from the Vmotor line 315 and microprocessor signals from control logic (not shown) to activate spindle drivers 330 at the proper moments to cause the spindle motor 340 to spin. The Rsense resistor 335 detects current flowing through the spindle motor 340 to aid in controlling the speed of the spindle motor 340. The spindle motor 340 includes a Y-winding motor having a U winding, V winding, and a W winding. The spindle drivers receives power from the V motor line 315 to drive the Y-winding spindle motor 340. The BEMF comparators 350 provide feedback to the spindle commutation block 320 to accurately control the speed of the spindle motor. The detailed operation of the various controls to the VCM coil 32 and spindle motor 340 during normal operation (i.e., power on) are well known in the HDA arts. Thus, the brief description provides background to the understanding of the present invention.

According to the present invention, as power is interrupted and falls below a predetermined acceptable operating range, the power monitor and RPM comparators 360 disables the VCM amplifier and retract block 310 via line 318 and opens the ISOFET switch 314 via ISO-EN signal to isolate the 12 volt power from the park and brake circuit 300. Disabling the VCM amplifier and retract block 310 via line 318 activates the VCM coil 312 to move the read/write head to the landing zone or parked position. The power monitor and RPM comparators 360 activates B&R (brake and retract) enable on line 325 which enables a brake & retract circuit of the spindle commutation block 320. RPM comparators of the power monitor and RPM comparators 360 monitors the rpm of the spindle motor. As the rpm of the spindle motor spins down to a predetermined RPM, rpm_high (i.e., rpm_h), the power monitor and RPM comparators block 360 activates a RPM<rpm_h signal on line 327 to enable operation of the brake & retract circuit of the spindle commutation block 320. The RPM<rmp-h signal limits activation of the brake & retract circuit to prevent excessive current that is generated during braking of the spindle motor 340. At a lower RPM, rpm_low (i.e., rpm_l), the RPM<rpm_l signal on line 329 disables the brake & retract circuit when the RPM comparators of the power and RPM comparators 360 detects a rpm low range and shorts all three spindle motor windings together for maximum braking. As the rpm low range occurs, the airlock of the HDA is locked and the read/write head is in the parked position.

The brake & retract circuit of the spindle commutation block 320 couples a first spindle driver associated with a first Y-winding to the Vmotor line 315 to provide power to the VCM amplifier and retract block 310, the ISOFET switch 314, and the spindle commutation block 320. At the same time, the brake & retract circuit of the spindle commutation block 320 shorts the second spindle driver associated with the second Y-winding with the third spindle driver associated with the third Y-winding in parallel to produce a braking effect, and further provide more power by being in series with the first winding. The spinning spindle motor 340 generates back EMF. Back EMF is a effect in which an electric motor acts as an electric generator. In the case of the spindle motor 340 for the HDA, the spinning disk induces electric current to flow in the motor windings that is directed to Vmotor on line 315 and to brake the spindle motor 340. BEMF phase detection is performed at precise moments during power-down to detect BEMF voltages in relation to a reference voltage such as e.g. zero-crossings.

As the back EMF generated from the spindle motor 340 continues to operate the spindle commutation block 320, the brake & retract circuit of the spindle commutation block 320 sequentially operate the spindle drivers 330 to direct power from a first Y-winding of the spindle motor 340 to the associated circuits coupled to the Vmotor line 315 and to short in parallel a second and a third Y-windings together in parallel to brake the spindle motor 340. Thus, the back EMF generated from the first Y-winding serially coupled to the shorted in parallel of the second Y-winding and the third Y-winding provides power to the Vmotor line 315. In the present invention, when the rpm of the spindle motor 340 reaches a predetermined low rpm value, the RPM<rpm_l signal on line 329 causes the brake & retract circuit of the spindle commutation block 320 to short the three spindle drivers 330 together to brake the spindle motor 340. At the predetermined low rpm value, the airlock is closed ad the read/write head is safely latched in the parked position.

Figure 4:
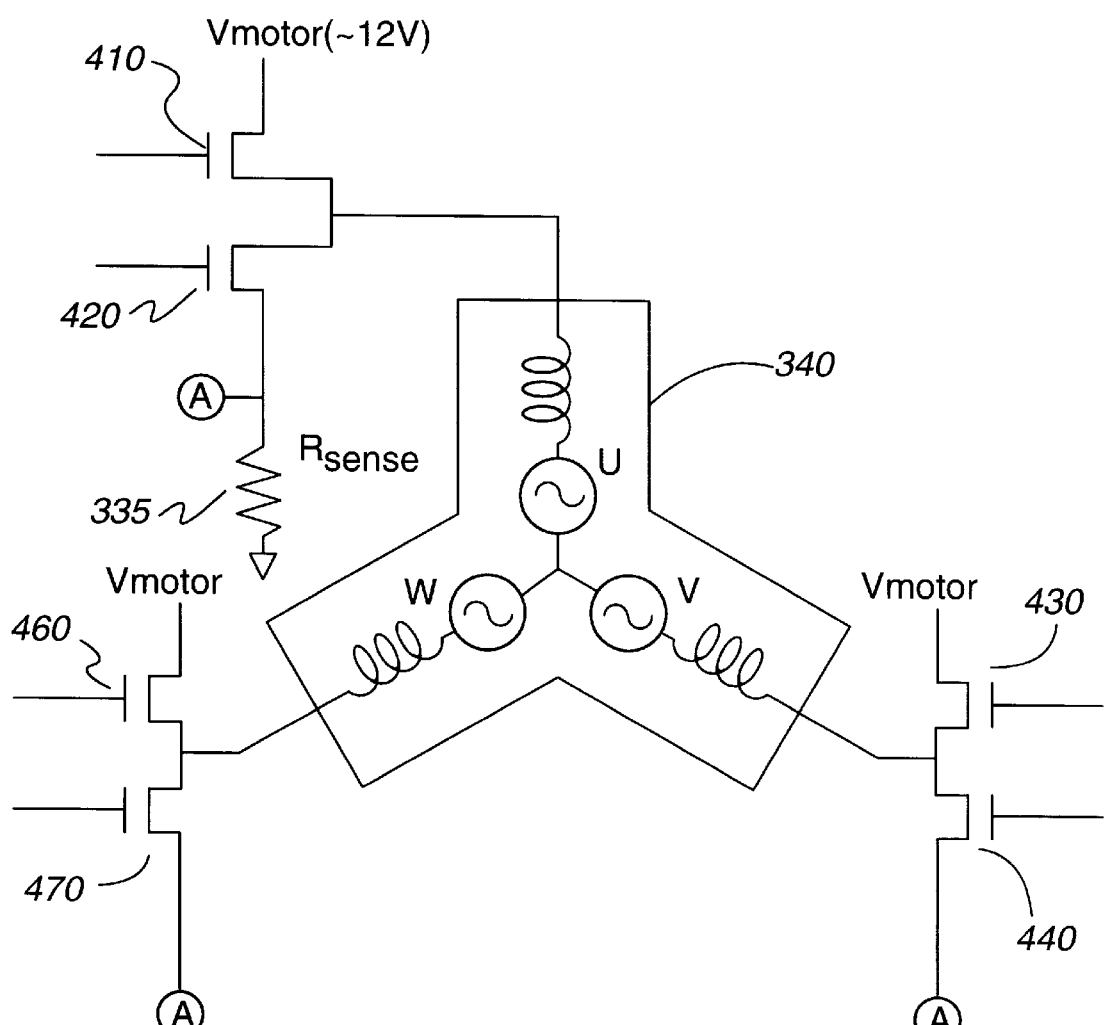
FIG. 4 illustrates a simplified schematic diagram of a spindle motor and spindle drives in accordance with the present invention.

FIG. 4 in conjunction with FIG. 3 illustrate a simplified schematic diagram of the spindle motor 340 and the spindle drivers 330. The spindle motor 340 is a Y-winding motor having a U phase coupled to U-Driver 321 including e.g. MOSFET drivers 410 and 420, a V phase coupled to V-Driver 322 including e.g. MOSFET drivers 430 and 440, and a W phase coupled to W-Driver 323 including e.g. MOSFET drivers 460 and 470. MOSFET drivers 410, 430, and 460 when activated couples the U phase, V phase, and W phase of the spindle motor 340 to the Vmotor line 315, respectively. MOSFET drivers 420, 440, and 470 when activated couples the U phase, V phase, and W phase of the spindle motor 340 to Rsense resistor 335 and to ground, respectively. During normal operation when power to the Vmotor line 315 is not interrupted, the spindle commutation block 320 causes the spindle motor to spin by activating a series of commutation cycles which sequentially activates the MOSFET drivers 410, 420, 430, 440, 460, and 470. For example, spinning the spindle motor 340 involves activating the MOSFET drivers 410 and the MOSFET driver 440 in a first sequence followed by activating MOSFET driver 460 and MOSFET driver 440. The sequence is followed by activating MOSFET driver 460 and MOSFET driver 420 and activating MOSFET driver 430 and MOSFET driver 420. Next, MOSFET driver 430 and MOSFET driver 470 are activated followed by MOSFET driver 410 and MOSFET driver 470. The spindle commutation block 320 repeats the sequence of six commutation cycles to spin the spindle motor 340. Current detected across the Rsense resistor 335 aid in controlling the speed of the spindle motor 340.

According to one embodiment of the present invention, after power loss, The brake & retract circuit of the spindle commutation block 320 dynamically sequences coupling a first winding in series with the other two windings shorted together in parallel to generate back EMF for supplying power to Vmotor line 315 and braking the spindle motor 340. The dynamic sequencing is based on modulating (e.g., detecting) BEMF vectors (i.e., phases) in the spindle motor windings during at least a portion of power failure, as described further below.

Figure 5A:
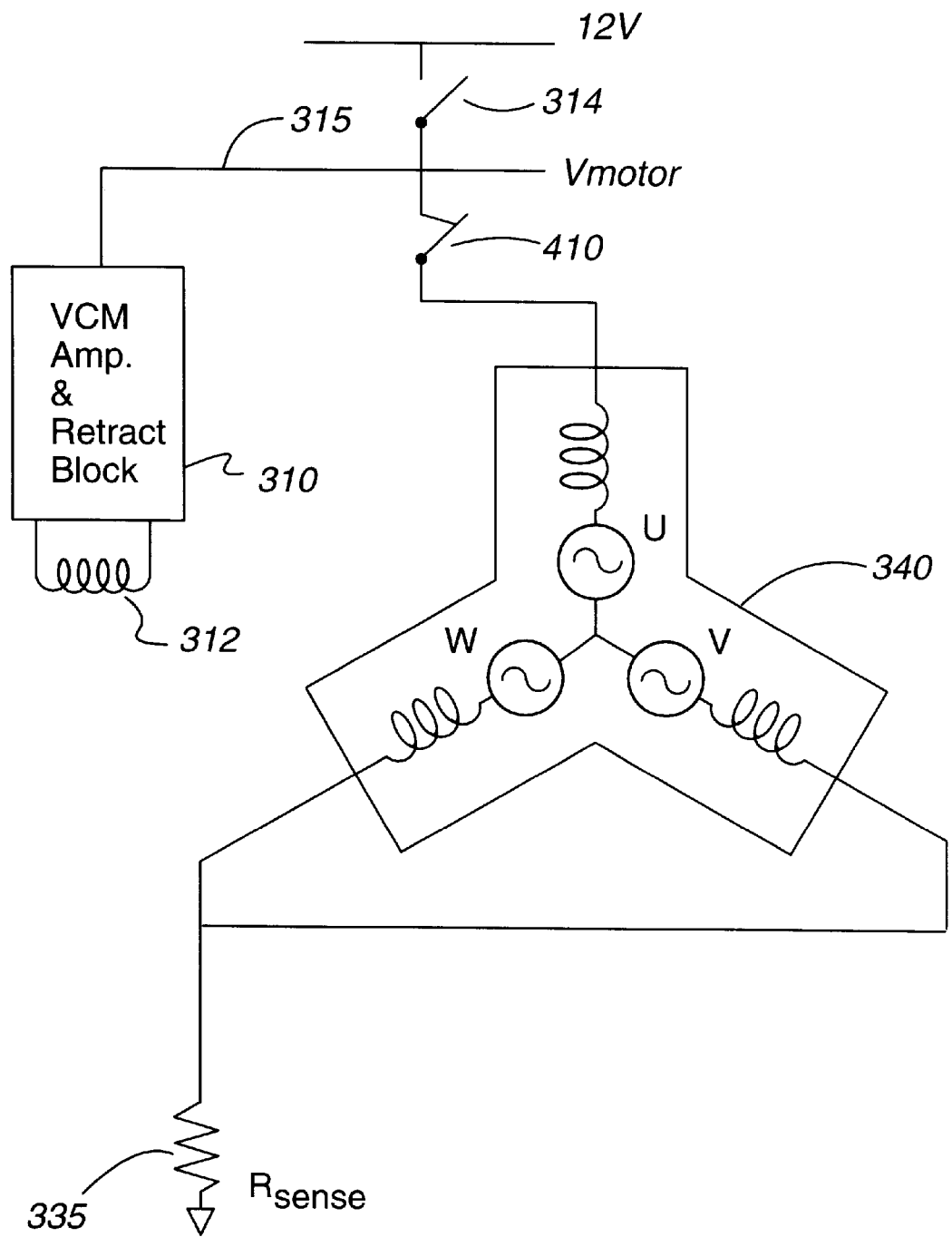
FIGS. 5A–C illustrate schematics of the Y-windings of the spindle motor during brake and retract in accordance with the present invention.
Figure 5B:
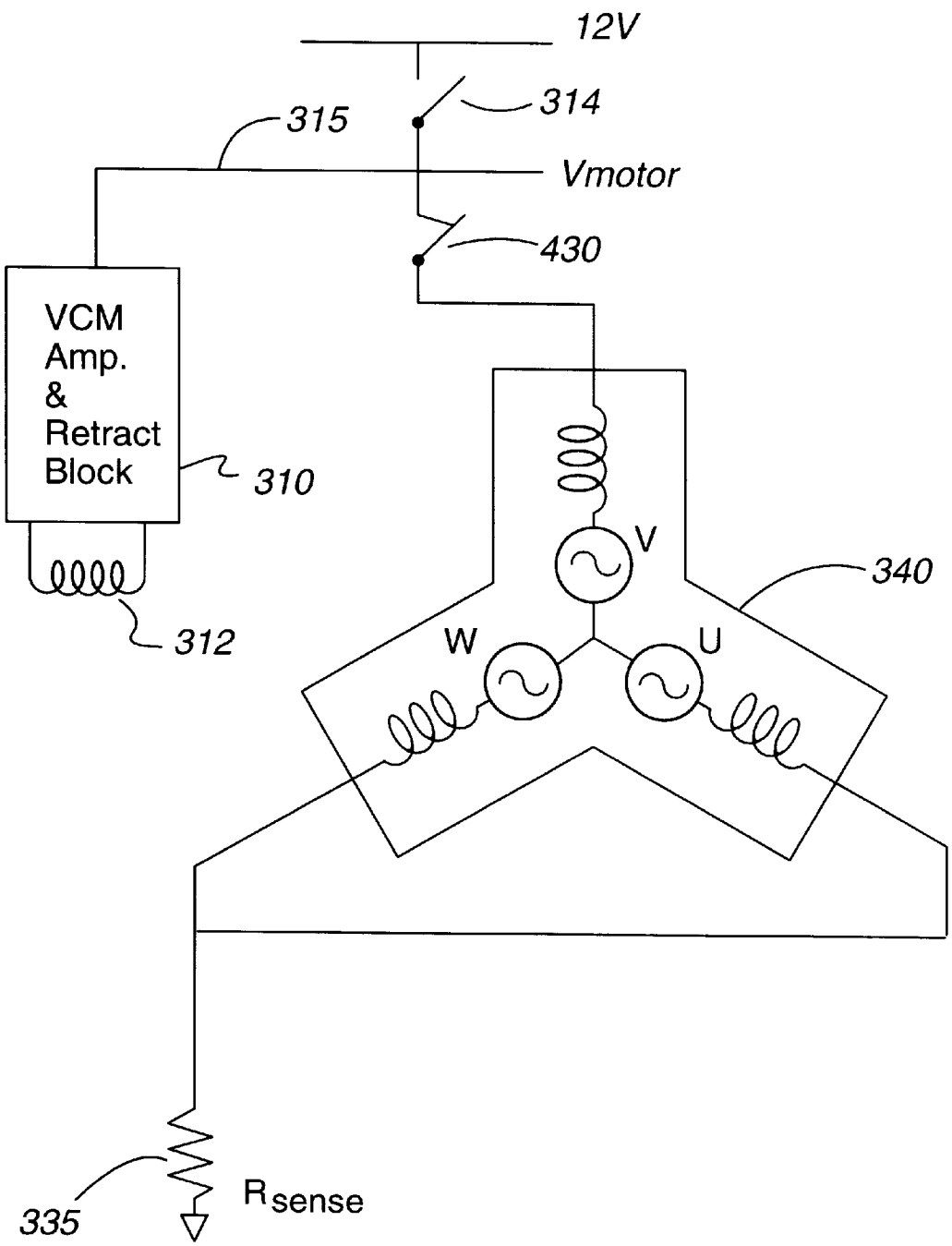
Figure 5C:
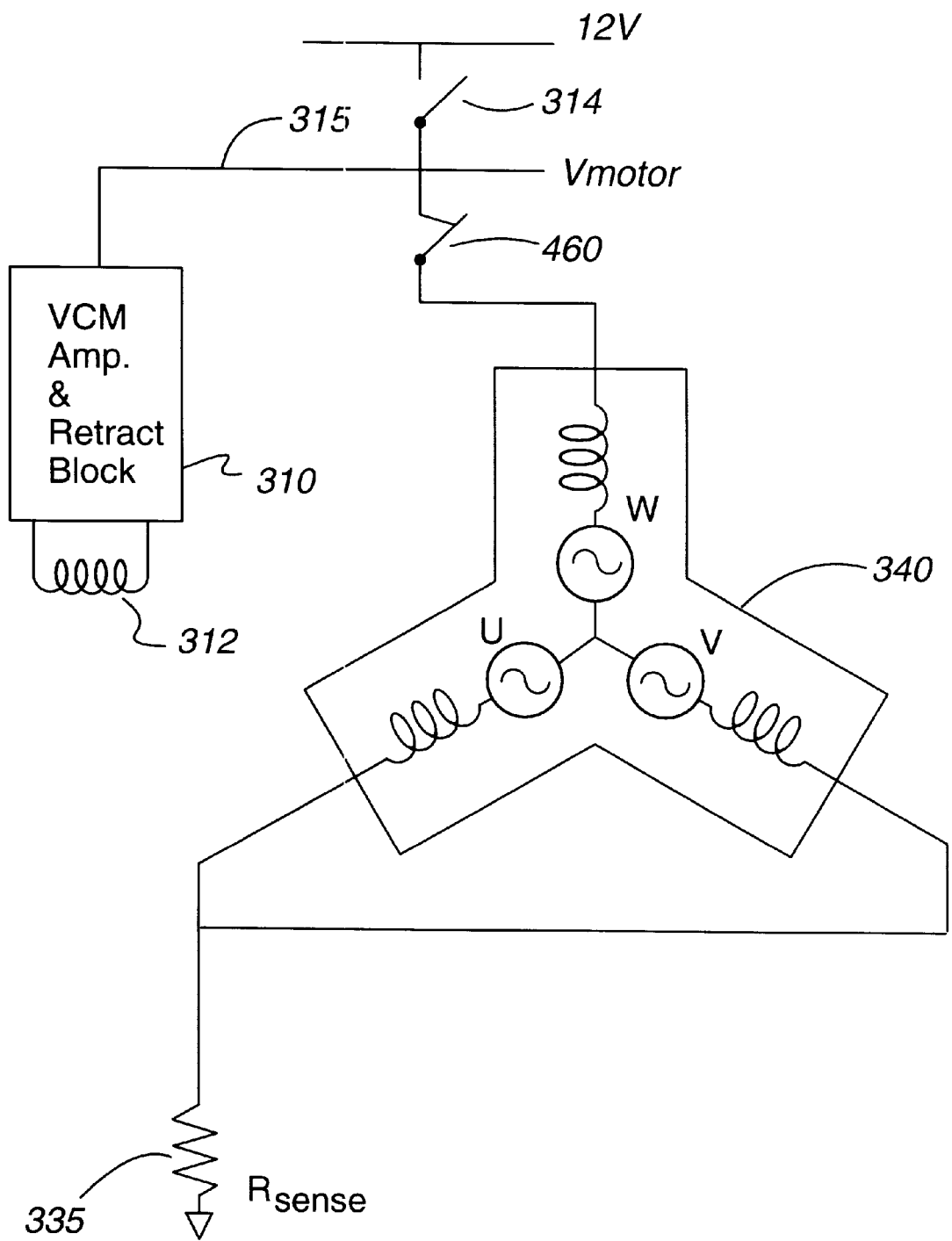

FIGS. 5A–C, illustrate example schematics of the spindle motor 340 during brake and retract, according to an embodiment of dynamic sequencing according to the present invention. During a power interruption, the ISOFET switch 314 opens to isolate the 12 volt supply voltage form the Vmotor line 315. In FIG. 5A, the brake & retract circuit of the spindle commutation block 320 activates the MOSFET switch 410 to couple the back EMF generated by the U winding of the spinning spindle motor 340 to the Vmotor line 315. The back EMF from the U winding in series with the parallel back EMF of windings V and W supplies power to the VCM amplifier and retract block 310. The VCM amplifier and retract block 310 energizes the VCM coil 312 to retract the read/write head to the parked position. At the same time, the brake & retract circuit of the spindle commutation block 320 short in parallel the V winding and W winding of the spindle motor together to generate back EMF for braking the spindle motor.

Next in sequence, as shown in FIG. 5B, the brake & retract circuit of the spindle commutation block 320 activates the MOSFET switch 430 to couple the back EMF generated by the V winding of the spinning spindle motor 340 to the Vmotor line 315. The back EMF from the V winding in series with the parallel back EMF of windings U and W supplies power to the VCM amplifier and retract block 310. The VCM amplifier and retract block 310 energizes the VCM coil 312 to retract the read/write head to the parked position. At the same time, the brake & retract circuit of the spindle commutation block 320 shorts in parallel the U winding and W winding of the spindle motor together to generate back EMF for braking the spindle motor. Next in sequence, a shown in FIG. 5C, the brake & retract circuit of the spindle commutation block 320 activates the MOSFET switch 460 to couple the back EMF generated by the U winding of the spinning spindle motor 340 to the Vmotor line 315. The back EMF from the U winding in series with the parallel back EMF of windings V and W supplies power to the VCM amplifier and retract block 310. The VCM amplifier and retract block 310 energizes the VCM coil 312 to retract the read/write head to the parked position. At the same time, the brake & retract circuit of the spindle commutation block 320 short in parallel the V winding and W winding of the spindle motor together to generate back EMF for braking the spindle motor. As such, the brake & retract circuit of the spindle commutation block 320 dynamically sequences coupling a first winding in series with the other two windings shorted together in parallel to generate back EMF for supplying power to Vmotor line 315 and braking the spindle motor 340.

Figure 6:
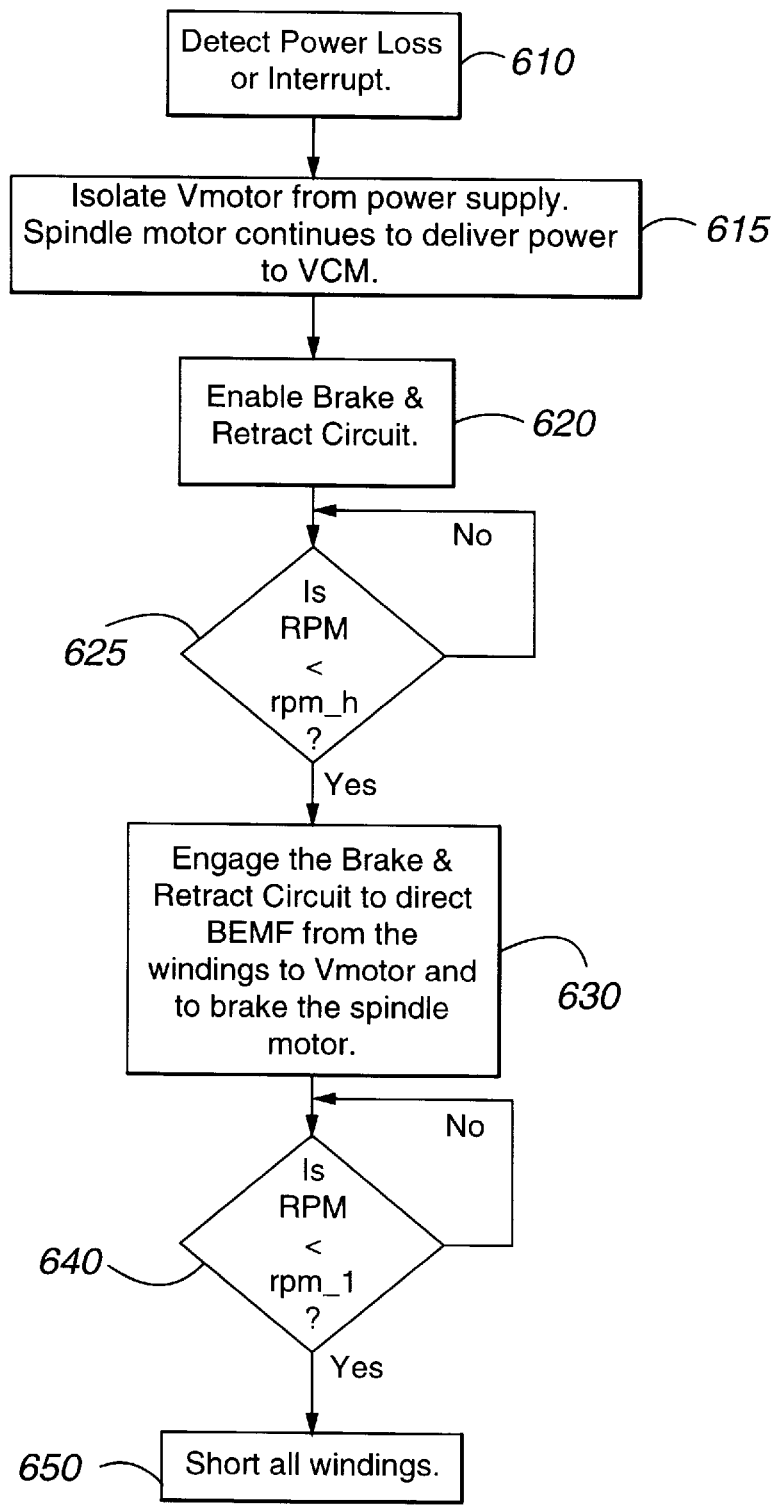
FIG. 6 illustrates a flow diagram for parking a read/write head during power interruptions.

FIG. 6 illustrate a flow diagram for parking a read/write head during power interruptions. The flow diagram begins with step 610 where the power monitor and RPM comparators 360 detects a power interruption with the power supply. In step 615, the power monitor and RPM comparators 360 disables the ISOFET switch 314 to isolate Vmotor line 315 from the power supply. Next, the power monitor and RPM comparators 360 enable the brake & retract circuit of the spindle commutation block 320 in step 620. In step 625, the power monitor and RPM comparators measures the spindle speed of the spindle motor 340 to determine that the spindle speed is within a predetermined maximum rpm to prevent damage, due to large current flow, to the Y-windings of the spindle motor 340. In step 630, when the spindle speed of the spindle motor 340 is less than or equal to the predetermined maximum (e.g., rpm__h), the spindle commutation block 320 directs back EMF generated from a first winding in series with the other two windings shorted in parallel to the Vmotor line 315. The two windings that are shorted in parallel provide braking to the spindle motor 340. The resultant Back EMF directed to the Vmotor line 315 powers the VCM amplifier and retract block 310, the ISOFET switch 314, the spindle commutation block 320 and the spindle drivers 330. Step 640 determines if the spindle speed of the spindle motor 340 is within a predetermined low speed. If the spindle motor exceeds the predetermined low speed, step 630 is repeated. When the spindle motor is within the predetermined low speed, step 650 shorts all the windings of the spindle motor 340 together for maximum braking. At the predetermined low speed, the airlock is latched and the read/write head of the HDA is safely parked.

As such, in one example upon power loss, the retract circuit of the commutation block 320 detects Back EMF (BEMF) zero-crossings in the coasting spindle motor 340 and shorts two windings together in parallel using spindle motor MOSFET drivers, while turning a third MOSFET on in a way to direct maximum spindle motor power to the Vmotor line 315. Shorting two windings together as described herein provides a strong retarding force for breaking the spindle motor. The brake & retract circuit of the spindle commutation block 320 dynamically sequences coupling a first winding in series with the other two windings shorted together in parallel to generate BEMF for supplying power to Vmotor line 315 and braking the spindle motor 340. Said dynamic sequencing is maintained with the proper phase and timing based on the motor revolutions, to continue diverting spindle motor maximum power to the Vmotor line while braking continues. The dynamic sequencing is maintained with a frequency proportional to the rotation of the spindle motor in sequential states as described herein.

After power loss, the rotating spindle motor continues to provide gate voltage to the power MOSFET drivers. The Vmotor line supply voltage is used to retract the actuator as well as providing power to the spindle/VCM IC 330. According to the present invention, in one example a significant headroom voltage of e.g. about 1.3 V (about 40% over conventional systems) at generally low rpm is achieved due to the synchronous (dynamic) switching of the spindle MOSFETs in proper phase with the coasting spindle motor BEMF voltage.

At power loss, the spindle motor coasts, and all spindle drivers 330 are off. The spindle MOSFETs (e.g., MOSFETs 410, 420, 430, 440, 460 and 470) body diodes deliver power for the actuator (e.g., Peak Vmotor=spindle BEMF−2 diode drops). Optionally, the VCM coil 312 provides a retarding force to slow down the moving actuator (e.g., lasting from a few milliseconds to a second or more). The actuator 18 is retracted at the ID using a constant pre-programmed DC voltage across the VCM coil 312. In one example, this is achieved by preprogramming the VCM amplifier and retract block 310 to set e.g. V=1.5 Volts (or other desired value), provided by the spindle motor, across the windings during power down (i.e., V=I*R, wherein the current I is provided by Vmotor 315).

In one embodiment, when power is first interrupted, the block 320 monitors winding BEMF zero-crossings for several motor cycles, and obtains a history of the timing of the BEMF zero-crossings. Because at high motor speeds the motor rpm does not change significantly from cycle to cycle, based on that history the block 320 determines when to selectively tristate the spindle/coil drivers 330. As such, the block 320 continues measuring the spindle motor rpm and measuring the time between the spindle motor BEMF zero-crossings, and when the motor RPM reaches rpm__h, the circuits 360, 320 and 350 cooperatively begin to selectively cycle the spindle MOSFETs (U-driver, V-driver, W-driver) on and off (e.g., by dynamic sequencing via the commutation block 320).

The motor RPM measurements can be accomplished by e.g. monitoring the Vmotor line (e.g., using a comparator for monitoring the Vmotor line against a programmable reference level) or actually measuring the motor RPM using e.g. timers, counters, and/or logic devices such as microprocessors. The rpm__h value can be user selectable to avoid large motor current and large power dissipation (Pd) of the driver chip.

After motor RPM reached about rpm__h, the BEMF comparators 350 are utilized as BEMF phase detectors (e.g., BEMF zero-crossing detectors) to provide feedback to the spindle commutation block 320 to accurately control dynamic sequencing of coupling a first winding in series with the other two windings shorted together in parallel to generate BEMF for supplying power to Vmotor line 315, based on the BEMF phases in the windings, according to the present invention. Signals from the circuit 350, corresponding to BEMF zero-crossings in the windings.

The block 320 includes a state machine responsive to the signals from the circuit 350, wherein each state in the state machine is related to a zero-crossing signal from the circuit 350. In one example, a set of commutation states are defined in temporal relation to the zero-crossing signals from the circuit 350 (are definitions of commutation state in relation to BEMF zero-crossings or other events are possible). Each signal from the circuit 350, indicating a BEMF zero-crossing in a winding, causes the state machine in the block 320 to generate a control signal for switching the windings. For example, during each state, the block 320 shorts the winding in which BEMF zero-crossing was detected with a second winding in parallel, and connects a third winding in series with that parallel combination.

Figure 7A:
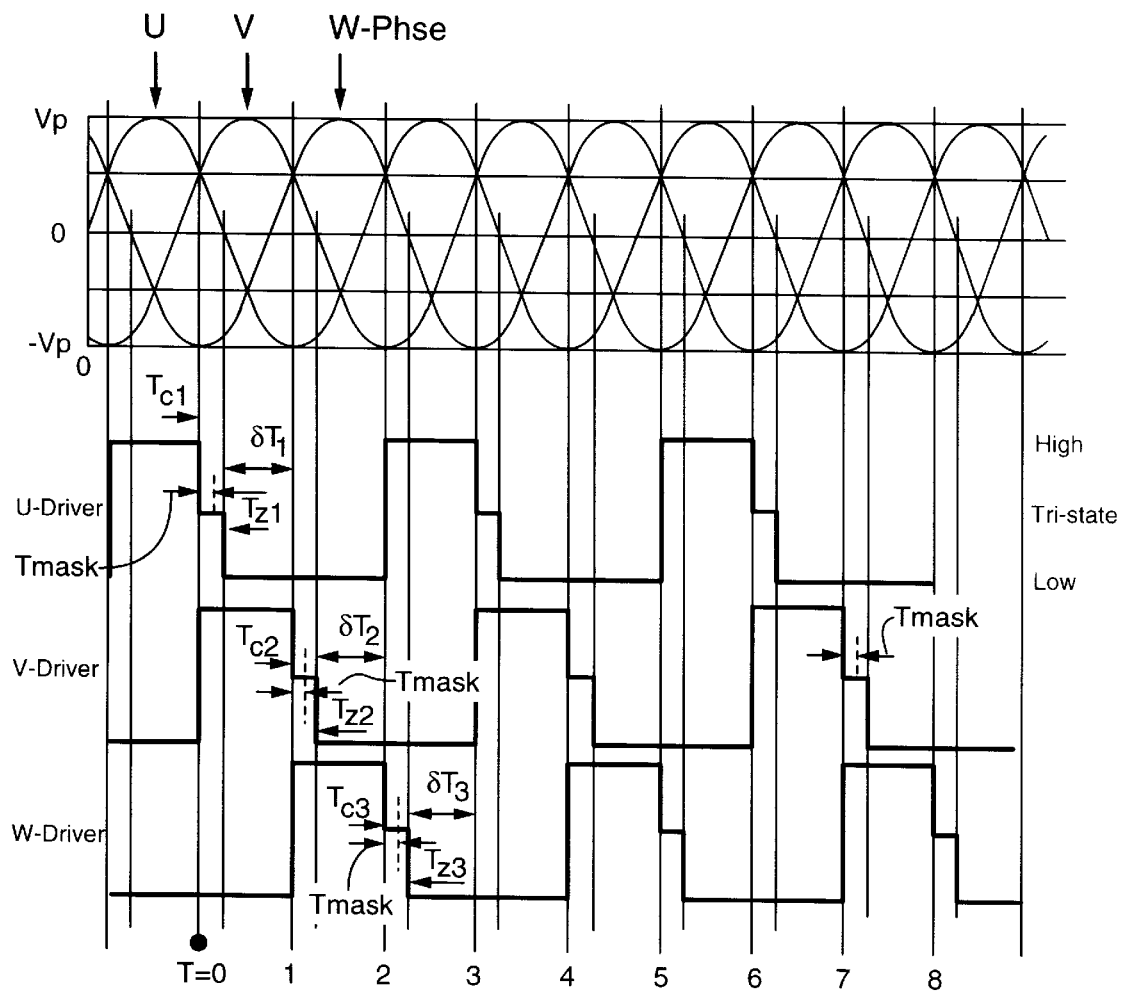
FIG. 7A illustrates an example timing diagram of an embodiment of dynamic sequencing of the winding connections, to provide braking and retraction power.
Figure 7B:
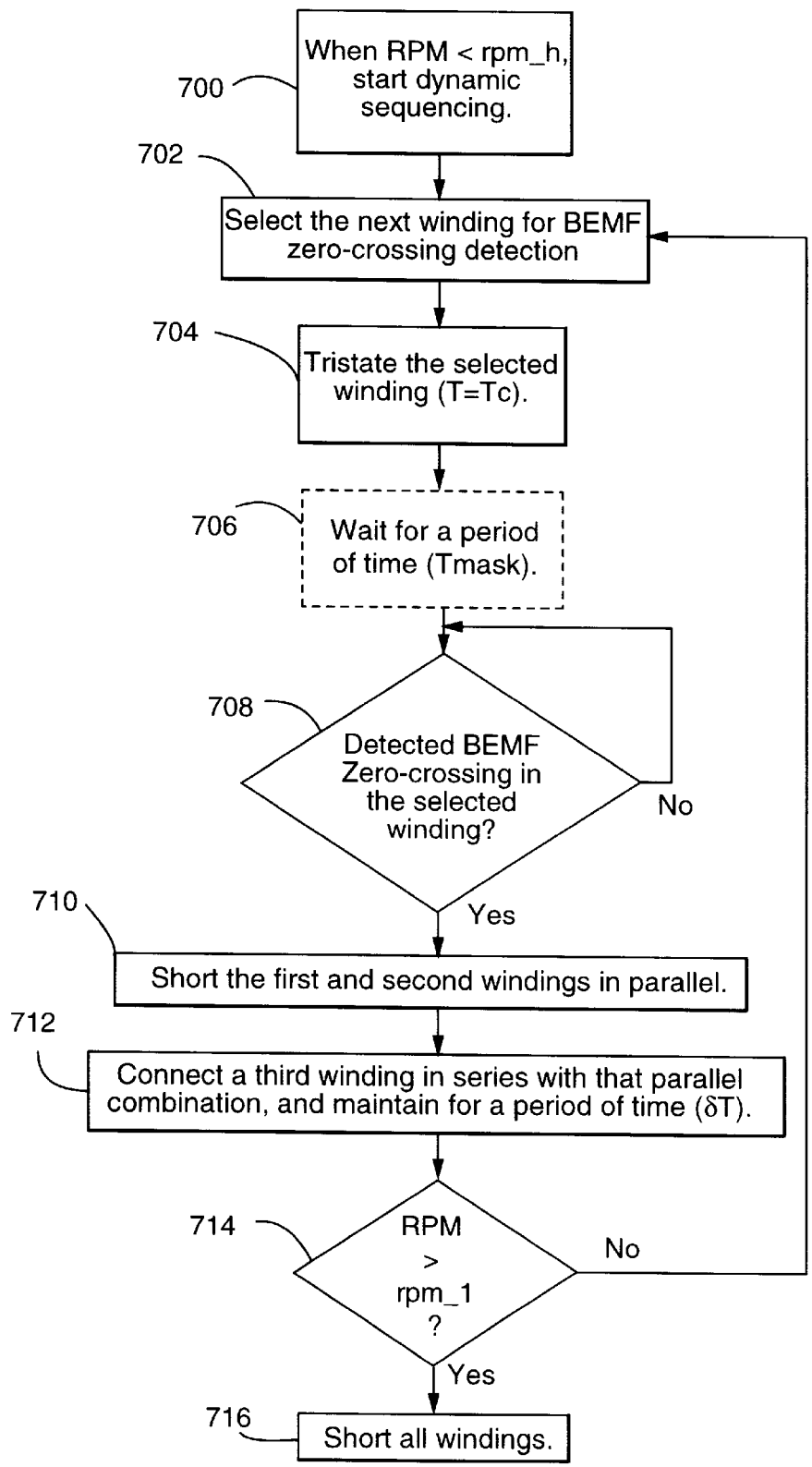
FIG. 7B shows an example flowchart of the steps in an embodiment of the dynamic sequencing.
Figure 8:
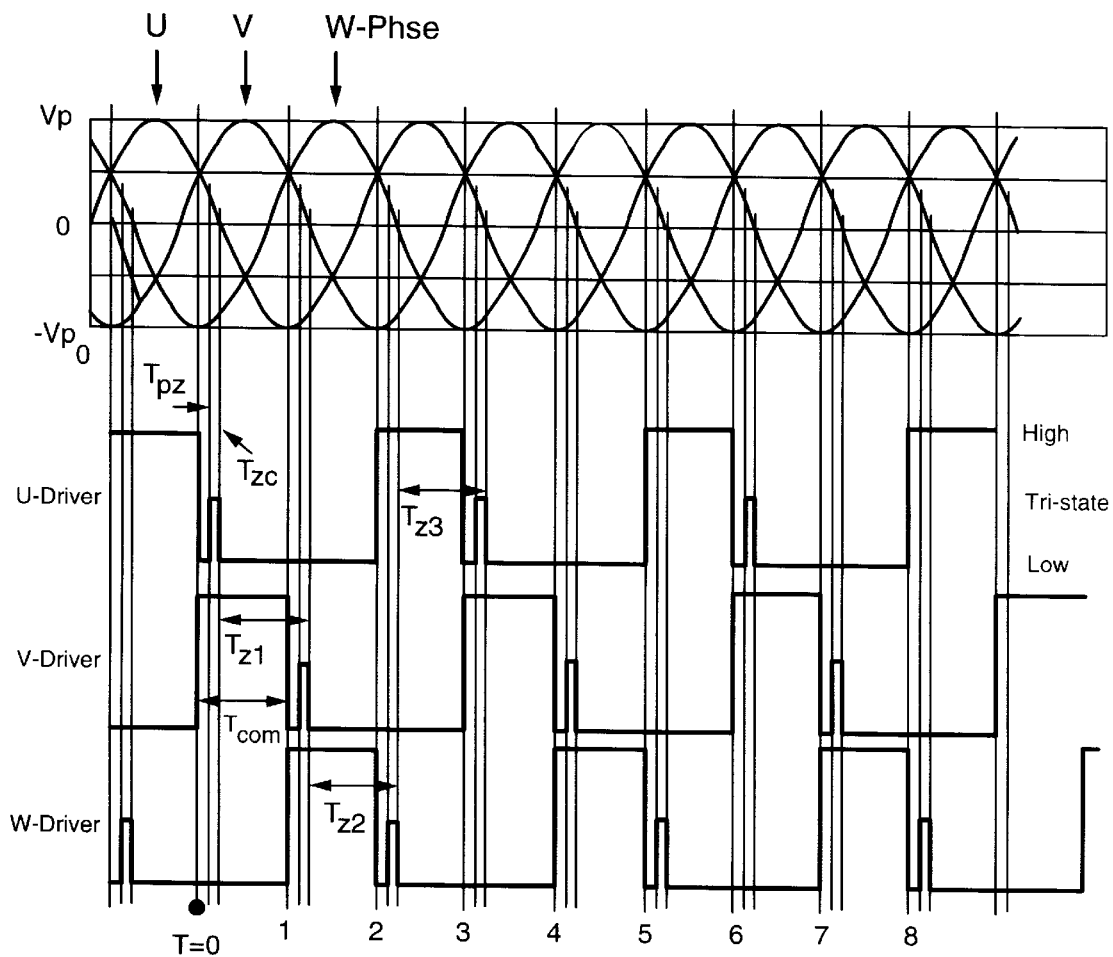
FIG. 8 illustrates an example timing diagram of another embodiment of dynamic sequencing of the winding connections, to provide braking and retraction power.

FIGS. 7–8, illustrate different example timing diagrams for said dynamic sequencing by the commutation block 320 according to the present invention. The pseudo-sinusoidal waveforms on top in FIG. 7A, comprise the BEMF voltage signals in the windings U, V and W of the coasting spindle motor. The commutation block 320 provides timing/control signals to the drivers 330 (e.g., U-Driver 321, V-Driver 322 and W-Driver 323 in FIG. 3) for said dynamic sequencing. Though in the description herein the MOSFETs 410 and 420 form the U-Driver 321, the MOSFETs 430 and 440 form the V-Driver 322, and the MOSFETS 460 and 470 form the W-Driver 323, other embodiments of the drivers 321, 322 and 323 including different switches and transistors are possible.

In one example operation, upon receiving a signal from the power monitor block 360 (rpm_h signal), informing the break & retract circuit of block 320 that the motor RPM is at about rpm_h, the block 320 begins BEMF phase detection (modulation). Thereafter, the commutation block 320 begins to dynamically sequence turning the spindle MOSFET drivers 330 on/off as shown in example timing of FIG. 7A. This provides a retarding force in the spindle motor by dynamically sequencing shorting of two windings in parallel for e.g. every 120 electrical degrees, with a third winding in series with the shorted two windings (in: parallel), to direct the maximum spindle power to the Vmotor line.

BEMF zero-crossings in the windings U, V and W have phases (frequency) which are changing in magnitude and duration because of changes in motor RPM due to slow-down after power loss. According to one aspect of present invention, BEMF phase detection (i.e., dynamic sequencing based on BEMF phase detection at e.g. BEMF zero-crossing) is used to selectively turn the winding driver switches on and off as described herein to achieve maximum breaking. Referring to the example of FIG. 7A, during power interruption before the motor RPM reaches rpm_h, the break & retract circuit of the block 320 keeps track of Back EMEF zero-crossing in the windings U, V and W of the coasting spindle motor, wherein all windings are tri-stated (as used herein, tri-state indicates disconnecting a winding from high and low). As such, the break & retract circuit of the block 320 can predict the next BEMF zero-crossing in the windings because the spindle motor can take e.g. 10 to 20 seconds to stop (reach 0 rpm) from e.g. about 7200 rpm, wherein at about 7000 rpm, two consecutive BEMF zero-crossing are only e.g. about 470 microseconds apart (for an example 3-phase, 12 pole spindle motor) and their width (zero-crossing time) is small. In the example FIG. 7A, Tc represents the time at which the break & retract circuit of block 320 predicts the switching changes for the three driver MOSFET switches. Tc has a relationship to the last BEMF zero-crossing (e.g., about 30 electrical degrees from last BEMF zero-crossing). Tz represents the time when the break & retract circuit of block 320 detects the next BEMF zero-crossing in one of the windings in response to signals from the circuit 350. Tmask represents a time period from the previous cycle for allowing transients to subside, wherein Tmask in each cycle n of the motor (i.e., commutation state n) can be obtained by the break & retract circuit of block 320 using the relation:

$Tmask_n$ aproximately equal to $(Tc_n-Tz_n)/N$, wherein n=0, 1, 2, ..., and wherein N can be an integer such as 2, 3, 4, etc.

At power loss, the state machine in the block 320 monitors the BEMF waveforms in the windings to collect a BEMF-zero crossing timing history. In one embodiment of the present invention, when the motor RPM is at rpm_h, the block 320 starts a switching sequence according to FIG. 7A. In one embodiment, each Tc (e.g., Tc1, Tc2, Tc3, ...) marks the beginning of a commutation state temporally related to a BEMF zero-crossing (i.e., Tc has a relationship to the last BEMF zero-crossing at Tz e.g., about 90 electrical degrees (or $\delta T$) from last BEMF zero-crossing, wherein for each commutation state n, $Tc_n=Tz_{n-1}+\delta T_{n-1}$). In FIGS. 7A and 8, the beginning of the sequential commutation states are also marked as T=0, 1, 2, 3, ... In each commutation state, at Tc the block 320 opens (tristates) a winding for detecting BEMF zero-crossing in that winding, then preferably waits for a period Tmask. Upon detecting the BEMF zero-crossing for that winding at Tz, a switching controller in the block 320 connects one winding in series with the parallel combination of two other windings to provide maximum voltage on Vmotor line 315, and maintains that mode for a period $\delta T$ (each time period $\delta Tn$ time about e.g. 90 electrical degrees from the last BEMF zero-crossing). Thereafter, using the BEMF zero-crossing history, the block 320 anticipates the next Tc (state), and opens (tristate) the next winding, waits for a period Tmask, detects BEMF zero-crossing of that winding occurring the next Tz and connects one winding in series with the parallel combination of two other windings, to provide maximum voltage on Vmotor line 315, and maintains that state for a period $\delta T$. The dynamic sequencing is repeated until motor RPM reaches about rpm_l.

The flowchart of FIG. 7B shows example steps of an embodiment of the dynamic sequencing (e.g., step 630 of FIG. 6). At power loss, the state machine in the block 320 monitors the BEMF waveforms in the windings to collect a BEMF-zero crossing timing history. When the motor RPM is at about rpm_h, the block 320 starts a dynamic switching sequence (e.g., as in FIG. 7A) (step 700). A first winding is selected (step 702), and at commutation time Tc=Tc1 the block 320 changes states by tristating the winding U (U-Driver in block 330 disconnects winding U). As used in the example herein, tristate indicates that a coil is disconnected from high and low voltages, and is floating, e.g. winding U is placed in tri-state by transistor 410 on, and transistor 420 off (step 704). In response to control signals from the commutation block 320, at time Tc1 (T=0) winding V is placed in logic high (e.g., V-Driver connects winding V to Vmotor line) and winding W is placed (or remains) at logic low (e.g., W-Driver shorts winding W to ground e.g. via Rsense). The block 320 waits for a short programmable masking period (Tmask1) (step 706), during which the commutation block 320 masks out any transition from the spindle BEMF comparators 350. In one example, each value Tmask per BEMF zero-crossing can be selected proportional to the difference Tc–Tz for that zero-crossing.

The block 320 then detects the next BEMF zero-crossing event at about Tz=Tz1 (step 708). For example, at about time Tz1, the rpm measuring circuit inside the commutation block 320: (1) detects the BEMF zero-crossing from the U winding, (2) prepares for detection of next BEMF zero-crossing, and (3) connects the winding U to ground via Rsense, whereby during a time period $\delta T1$ windings W and U are shorted to ground in parallel (step 710), and winding V is connected in series with parallel combination of said winding W and U, to provide maximum voltage on Vmotor line 315 (step 712). The commutation block 320 can mask out the spindle BEMF information from circuit 350 again to ensure that incorrect information is not sent to the block 320 from circuit 350. The above steps are repeated until the motor RPM reaches about rpm_l (step 714), wherein all windings are shorted (step 716).

Additional example steps in FIG. 7A of the dynamic sequencing are further described below. After the period of time $\delta 1$, at time Tc2 (T=1), the block 320 advances to the next state and tristates winding V (e.g., opens winding V), and winding W is connected to Vmotor (logic high). Winding U remains low (switched to ground via Rsense). At time Tz2, after a masking period of Tmask (Tmask2), the commutation block 320 detects the next BEMF zero-crossing from the V winding, and connects winding V to ground (e.g., Via Rsense) and windings U and W maintain their status for a period of time $\delta T2$, until time Tc3. During the time period $\delta T2$, windings V and U are shorted to ground in parallel, and winding W is connected in series with parallel combination of said winding V and U to the voice coil, to provide maximum voltage possible on Vmotor line 315.

After passage of the time period δT2, at time Tc3 (T=2), the block 320 changes states and tristates winding W, and connects winding U to logic high (e.g., U-Driver connects winding U to Vmotor line). Winding V remains low (switched to ground via Rsense). At time Tz3 the block 320 detects zero-crossing of BEMF voltage in winding W, and connects winding W to ground (e.g., via Rsense), and windings U and V maintain their status until next commutation time Tc4 (T=3). During a time period δT3, windings V and W are shorted to ground in parallel, and winding U is connected in series with parallel combination of said winding V and W, to provide maximum voltage on Vmotor line 315. The above example steps are repeated, wherein windings U, V, W, U, V, W, . . . , are sequentially selected for BEMF zero-crossing detection, until motor RPM is less than rpm_1.

Each BEMF zero-crossing time Tz can be predicted by the commutation block 320 based on the previous two consecutive zero-crossing times. For example, the time Tz3 can be determined by the commutation block 320 by the relation Tz3=(Tz2−Tz1)*K1, wherein K1 (K1>1) accounts for: (1) decrease in spindle motor RPM due to braking effect of the retarding force, whereby each δTn is larger than its previous value $\delta T_{n-1}$, and (2) the next BEMF zero-crossing always occurs after the commutation of each of the three windings. K1 can be programmed by the user via a resistor or a register by the microprocessor before loss of power, or calculated in real-time by the block 320. A built-in default K1 can also be provided.

As such, at BEMF zero-crossings (Tzn), the block 320 is re-synchronized with BEMF frequency (e.g., phase or zero-crossings). As motor RPM decreases under breaking, the time interval between zero crossings (Zcx) increases. After each BEMF zero-crossing, the block 320 selectively advances a winding from tristate to either high (Vm volts) or low (e.g., ground via Rsense), after each commutation. At Tc a switch is opened (tristate) to detect BEMF zero-crossing of a winding at Tzn, and re-synchronize the block 320 such that in the next cycle the block 320 can predict when to sequentially open (tristate) the next winding in the example sequence U, V, W, U, V, W, . . . , to detect BEMF zero-crossing of that winding. As such, at Tc the block 320 anticipates BEMF zero-crossings to occur at Tz, then wait for Tmask after Tc for transients to subside, then detects BEMF zero-crossings at Tz, and upon a zero-crossing detection, switches winding connections as described herein.

Commutation continues as in FIG. 7A, for delivering maximum power to the Vmotor line, while at the same time generating a large retarding force in the spindle motor. Before some speed rpm_low (i.e., rpm_1), the airlock mechanism reaches its locking RPM, wherein there is no need to keep the actuator energized. After this point, the three windings are shorted together via the spindle power MOSFETs without BEMF phase detection. The commutation block 320 function at this points is simple, as only three spindle power MOSFETs 420, 440, 470 are kept on via a reservoir capacitor to keep the MOSFET gates at proper voltage (e.g., high voltage). A low leakage and small capacitor can provide this voltage assuming the IC path to the MOSFETs driver gate has low leakage.

The present invention eliminates the conventional two diode-drop loss caused by directing power via driver MOSFET switches, by shorting the MOSFTES on and off according to the dynamic switching model described herein. This further provides more voltage range availability for parking the transducers. As such, when the motor RPM is at about rpm_h, the break & retract circuit, anticipating the time of the next BEMF zero-crossing at Tz, selectively turns on/off the driver MOSFETs (e.g., U high, and V and W low). The break & retract circuit then waits for duration of δT and tristates a winding, keeping track of the slowdown rate of the motor, anticipating the next BEMF zero-crossing, as described herein. The sequence continues until the motor RPM is at rpm_l, wherein all the windings are shorted for maximum breaking if needed.

Example timing diagram of FIG. 8 shows another embodiment of the method of dynamically sequencing connections of the windings by the commutation block 320 according to the present invention, for delivering maximum power to the Vmotor line while at the same time generating a large retarding force in the spindle motor (e.g., about 85% of maximum BEMF that can; be achieved by connecting two of the coils in series for a Y-winding). In this example, the time-to-zero-rpm is reduced because at T=0,1,2, . . . N, the windings U, V, W, U, V, W, . . . do not assume tri-state immediately, but rather are connected to ground via Rsense. For example, for the U winding at T=0 (T0), this mode lasts until Tpz, wherein the commutation block 320 tri-states the U winding with a programmable time Tmask before the BEMF zero-crossing at Tzc, to prepare for the U winding zero-crossing detection (i.e., enabling comparator or allows its information to go to block 320). Higher breaking efficiency is achieved because from T0 to Tpz, the motor is also generating the large retarding for to break the motor, continued at T=1, 2, . . . , N. In FIG. 8, Tcom represents commutation time (time difference). Other example dynamic sequencing schemes according to the present invention are possible.

While the foregoing detailed description has described embodiments of the apparatus and methods for parking a read/write head during power interruptions with maximum power efficiency, it is to be understood that the above description is illustrative only and not limiting of the disclosed invention. Obviously, many modifications and variations will be apparent to the practitioners skilled in this art. Accordingly, the apparatus and methods for parking a read/write head during a power interruption have been provided. During power interruptions which includes disconnecting the HDA from a power source such as the 5 volt or 12 volt, placing the read/write head in the designed landing zone in a short time from the incidence of power interruption greatly enhanced the longevity of the HDA. Moreover, the brake & retract circuit modifies existing commutation cycles already present in the spindle commutation block 320 that operate the spindle motor 340. Further, although the present invention was described in conjunction with a Y-winding spindle motor above, the present invention is equally useful with other spindle motors such as delta-winding spindle motors. Thus, the apparatus the methods for parking a read/write head during power interruption afford a simple low cost and effective solution for reducing the time a HDA is prone to external shock during a power interruption.

What is claimed is:

1. An apparatus for reducing the time to steady state an operating disk drive having a multi-phase wound spindle motor including a rotor and multiple windings, and an actuator arm coupled to a voice coil for latching the actuator arm when power is interrupted, comprising:

a commutation phase generator coupled to the spindle motor for generating a set of sequential signals in response to BEMF voltages in the spindle motor windings, the sequential signals relating to a sequence of commutation states, and a commutation controller responsive to the sequential signals, wherein in each commutation state, the commutation controller shorts a first winding and a second winding to generate a retarding force against the spindle motor and to direct power generated by at least a third winding to the voice coil for moving the actuator arm to a latched position.

2. The apparatus of claim 1, wherein the commutation phase generator generates said sequential signals to the commutation controller to provide maximum power in each commutation state for retarding the spindle motor and moving the actuator arm to a latched position.

3. The apparatus of claim 1 wherein the commutation controller shorts the first winding and the second winding in parallel to produce the retarding force.

4. The apparatus of claim 3, wherein the commutation controller serially couples the third winding to the voice coil.

5. The apparatus of claim 1, wherein in each commutation state the commutation controller couples the third winding in series with the first and second windings shorted together in parallel, such that: (1) said series combination provides power to the voice coil for moving the actuator arm to the latched position, and (2) said parallel combination produces a retarding force against the spindle motor.

6. The apparatus of claim 1 further comprising a first switch coupled to the first winding, a second switch coupled to the second winding and a third switch coupled to the third winding,
wherein the commutation controller couples the first switch of the first winding with the second switch of the second winding, and couples the third switch of the third winding to the voice coil.

7. The apparatus of claim 6, wherein the first switch includes a first spindle MOSFET driver, the second switch includes a second spindle MOSFET driver, and the third switch includes a third spindle MOSFET driver.

8. The apparatus of claim 7, wherein the commutation controller activates the first spindle MOSFET driver and the second spindle MOSFET driver to couple the first winding in parallel with the second winding and activates the third MOSFET driver to couple in series the third winding to the voice coil.

9. The apparatus of claim 1, wherein the commutation phase generator generates said sequential signals in response to BEMF voltage zero-crossings in the spindle motor windings.

10. The apparatus of claim 1, wherein the spindle motor includes three windings and wherein each winding has a first terminal and a second terminal, wherein the first terminals of the windings are connected together at a center tap.

11. The apparatus of claim 1, wherein:
the commutation phase generator includes a BEMF detector responsive to BEMF voltages in the spindle motor windings, for generating said sequential signals in response to a sequence of BEMF zero-crossings in the windings, and
the commutation controller includes:
a state machine responsive to said sequential signals, wherein in each state the state machine: (1) selects a first winding, and (2) upon detecting a BEMF zero-crossing in that first winding generates a control signal corresponding to that BEMF zero-crossing; and
a switching controller responsive to the control signals of the state machine, for shorting the first winding and a second winding to generate a retarding force against the spindle motor and to direct power generated by at least the third winding to the voice coil for moving the actuator arm to a latched position.

12. The apparatus of claim 11, wherein in each state, the state machine electrically disconnects said selected first winding to electrically float (tristate) for detecting BEMF voltages in that selected first winding.

13. The apparatus of claim 11, wherein:
each commutation state n begins substantially at a time $Tc_n$, and a BEMF zero-crossing in the state n occurs substantially at a time $Tz_n$, such that $Tc_n = Tz_{n-1} + \delta T_{n-1}$, wherein $\delta T_{n-1}$ represents a time period proportional to the time interval between consecutive BEMF zero-crossings in the windings in states n−1 and n, and
each $Tz_n$ substantially coincides with a signal from the commutation phase generator indicating a corresponding BEMF zero-crossing in a winding.

14. The apparatus of claim 13, wherein in each commutation state n:
the state machine electrically floats the selected first winding at about $Tc_n$ to detect BEMF zero-crossing in that selected winding at about $Tz_n$, and generates said control signal upon detecting said BEMF zero-crossing, and
in response to said control signal, during at least a portion of the time period $\delta T_n$ the switching controller shorts the first winding and a second winding to generate a retarding force against the spindle motor and to direct power generated by at least the third winding to the voice coil for moving the actuator arm to a latched position.

15. An apparatus for reducing the time to steady state an operating disk drive having an actuator arm coupled to a voice coil for latching the actuator arm when power is interrupted, comprising:
a spindle motor having a first winding, a second winding and a third winding;
a phase generator coupled to the spindle motor for generating a set of sequential signals in response to voltages in the spindle motor windings; and
a spindle motor controller responsive to the phase generator, wherein in response to the sequential signals the spindle motor controller selectively shorts the first winding and the second winding to produce a retarding force against the spindle motor and to direct power produced by the third winding to the voice coil for moving the actuator arm to a latched position.

16. The apparatus of claim 15, wherein the spindle motor controller shorts the first winding and the second winding in parallel to produce the retarding force.

17. The apparatus of claim 16, wherein the spindle motor controller serially couples the third winding to the voice coil.

18. The apparatus of claim 15 further comprising a power isolation switch coupled to a power supply and wherein the spindle motor controller opens the power isolation switch when the power is interrupted.

19. The apparatus of claim 15, wherein:
the spindle motor controller shorts the first winding and the second winding in parallel, providing a parallel combination of the first and second windings to produce the retarding force, and
the spindle motor controller electrically couples the third winding between the voice coil and said parallel combination of the first and second windings, to direct power produced by the third winding with parallel combination of first and second windings, to the voice coil for moving the actuator arm to a latched position.

20. The apparatus of claim 15, wherein the spindle motor controller dynamically sequences:

coupling a winding in series with two other windings shorted together in parallel, and directing power produced by said series combination to the voice coil for moving the actuator arm to the latched position.

21. The apparatus of claim 15, wherein the spindle motor controller dynamically sequences:

shorting two windings to produce a retarding force against the spindle motor.

22. The apparatus of claim 15, wherein the spindle motor controller is further configured for:

dynamically sequencing coupling a winding in series with two other windings shorted together in parallel, wherein during each sequence: (1) said series combination provides power to the voice coil for moving the actuator arm to the latched position, and (2) said parallel combination produces a retarding force against the spindle motor.

23. The apparatus of claim 15, wherein the spindle motor comprises a Y-winding spindle motor having three windings.

24. A disk drive having at least one data storage disk, a read/write transducer for reading and writing data, and a voice coil to move the read/write transducer in close proximity to the one data storage disk, the disk drive comprising:

a latch body having an airvane portion disposed above the data storage disk configured to deflect from impinging airflow generated by the spinning data storage disk for unlatching the read/write transducer from a landing zone;

a spindle motor attached to the data storage disk having a first winding, a second winding, and a third winding configured to rotate the data storage disk;

a commutation phase generator coupled to the spindle motor for generating a set of sequential signals in response to BEMF voltages in the spindle motor windings, the sequential signals relating to a sequence of commutation states; and a commutation controller responsive to the sequential signals, wherein in each commutation state, the commutation controller shorts a first winding and a second winding to generate a retarding force against the spindle motor and to direct power generated by at least a third winding to the voice coil for moving the read/write transducer to the landing zone.

25. The disk drive of claim 24, wherein the commutation phase generator generates said sequential signals to the commutation controller to provide maximum power in each commutation state for retarding the spindle motor and moving the read/write transducer to the landing zone.

26. The disk drive of claim 24, wherein the commutation controller shorts the first winding and the second winding in parallel to produce the retarding force.

27. The disk drive of claim 26, wherein the commutation controller serially couples the third winding to the voice coil.

28. The disk drive of claim 24, wherein in each commutation state the commutation controller couples the third winding in series with the first and second windings shorted together in parallel, such that: (1) said series combination provides power to the voice coil for moving the read/write transducer to the landing zone, and (2) said parallel combination produces a retarding force against the spindle motor.

29. The disk drive of claim 24 further comprising a first switch coupled to the first winding, a second switch coupled to the second winding and a third switch coupled to the third winding, wherein the commutation controller couples the first switch of the first winding with the second switch of the second winding, and couples the third switch of the third winding to the voice coil.

30. The disk drive of claim 29, wherein the first switch includes a first spindle MOSFET driver, the second switch includes a second spindle MOSFET driver, and the third switch includes a third spindle MOSFET driver.

31. The disk drive of claim 30, wherein the commutation controller activates the first spindle MOSFET driver and the second spindle MOSFET driver to couple the first winding in parallel with the second winding and activates the third MOSFET driver to couple in series the third winding to the voice coil.

32. The disk drive of claim 24, wherein the commutation phase generator generates said sequential signals in response to BEMF voltage zero-crossings in the spindle motor windings.

33. The disk drive of claim 24, wherein each winding has a first terminal and a second terminal, wherein the first terminals of the windings are connected together at a center tap.

34. The disk drive of claim 24, wherein:

the commutation phase generator includes a BEMF detector responsive to BEMF voltages in the spindle motor windings, for generating said sequential signals in response to a sequence of BEMF zero-crossings in the windings, and the commutation controller includes:

a state machine responsive to said sequential signals, wherein in each state the state machine: (1) selects a first winding, and (2) upon detecting a BEMF zero-crossing in that first winding generates a control signal corresponding to that BEMF zero-crossing; and a switching controller responsive to the control signals of the state machine, for shorting the first winding and a second winding to generate a retarding force against the spindle motor and to direct power generated by at least the third winding to the voice coil for moving the read/write transducer to the landing zone.

35. The disk drive of claim 34, wherein in each state, the state machine electrically disconnects said selected first winding to electrically float (tristate) for detecting BEMF voltages in that selected first winding.

36. The disk drive of claim 34, wherein:

each commutation state n begins substantially at a time $Tc_n$, and a BEMF zero-crossing in the state n occurs substantially at a time $Tz_n$, such that $Tc_n = Tz_{n-1} + \delta T_{n-1}$, wherein $\delta T_{n-1}$ represents a time period proportional to the time interval between consecutive BEMF zero-crossings in the windings in states n−1 and n, and each $Tz_n$ substantially coincides with a signal from the commutation phase generator indicating a corresponding BEMF zero-crossing in a winding.

37. The disk drive of claim 46 wherein in each commutation state n:

the state machine electrically floats the selected first winding at $Tc_n$ to detect BEMF zero-crossing in that selected winding at $Tz_n$, and generates said control signal upon detecting said BEMF zero-crossing, and in response to said control signal, during at least a portion of the time period $\delta T_n$ the switching controller shorts the first winding and a second winding to generate a retarding force against the spindle motor and to direct power generated by at least the third winding to the voice coil for moving the read/write transducer to the landing zone.

38. A disk drive having at least one data storage disk, a read/write transducer for reading and writing data, and a voice coil to move the read/write transducer in close proximity to the one data storage disk, the disk drive comprising:
   a latch body having an airvane portion disposed above the data storage disk configured to deflect from impinging airflow generated by the spinning data storage disk for unlatching the read/write transducer from a landing zone;
   a spindle motor attached to the data storage disk having a first winding, a second winding, and a third winding configured to rotate the data storage disk;
   a phase generator coupled to the spindle motor for generating a set of sequential signals in response to voltages in the spindle motor windings; and
   a spindle motor controller coupled to the phase generator, wherein in response to the sequential signals the spindle motor controller dynamically sequences: shorting a first winding and a second winding to produce a retarding force against the spindle motor and to direct power produced by a third winding to the voice coil motor for moving the read/write transducer to the landing zone.

39. The disk drive of claim 38, wherein the spindle motor controller shorts the first winding and the second winding a parallel to produce the retarding force.

40. The disk drive of claim 39, wherein the spindle motor controller serially couples the third winding to the voice coil to energize the voice coil.

41. The disk drive of claim 40, wherein the retarding force reduces rotation of the Y-winding spindle motor decreasing airflow such that the latch body latches the read/write transducer to the landing zone.

42. The disk drive of claim 38, wherein:
   the spindle motor controller shorts the first winding and the second winding in parallel, providing a parallel combination of the first and second windings to produce the retarding force, and
   the spindle motor controller electrically couples the third winding between the voice coil and said parallel combination of the first and second windings, to direct power produced by the third winding with parallel combination of first and second windings, to the voice coil for moving the read/write transducer to the landing zone.

43. An method for reducing the time to steady state an operating disk drive having a multi-phase wound spindle motor including a rotor and multiple windings, and an actuator arm coupled to a voice coil for latching the actuator arm when power is interrupted, comprising the steps of:
   (a) generating a set of sequential signals in response to BEMF voltages in the spindle motor windings, the sequential signals relating to a sequence of commutation states, and
   (b) in each commutation state, shorting a first winding and a second winding to generate a retarding force against the spindle motor and to direct power generated by at least a third winding to the voice coil for moving the actuator arm to a latched position.

44. The method of claim 43, wherein step (a) further comprises the steps of generating said sequential signals to provide maximum power in each commutation state for retarding the spindle motor and, moving the actuator arm to a latched position.

45. The method of claim 43, wherein step (b) further comprises the steps of:
   in each commutation state, shorting the first winding and the second winding in parallel to produce the retarding force.

46. The method of claim 43, wherein step (b) further comprises the steps of:
   in each commutation state, serially coupling the third winding to the voice coil.

47. The method of claim 43, wherein step (b) further comprises the steps of:
   in each commutation state, coupling the third winding in series with the first and second windings shorted together in parallel, such that: (1) said series combination provides power to the voice coil for moving the actuator arm to the latched position, and (2) said parallel combination produces a retarding force against the spindle motor.

48. The method of claim 43, wherein step (a) further comprises the steps of:
   generating said sequential signals in response to BEMF voltage zero-crossings in the spindle motor windings.

49. The method of claim 48, wherein step (b) further comprises the steps of:
   in each commutation state: (1) selecting a first winding and (2) upon detecting a BEMF zero-crossing in that first winding shorting the first winding and a second winding to generate a retarding force against the spindle motor and to direct power generated by at least the third winding to the voice coil for moving the actuator arm to a latched position.

50. The method of claim 49, wherein step (b) further comprises the steps of:
   in each commutation state, electrically disconnecting said selected first winding to electrically float (tristate) for detecting BEMF voltages in that selected first winding.

51. The method of claim 49, wherein:
   each commutation state n begins substantially at a time $Tc_n$, and a BEMF zero-crossing in the state n occurs substantially at a time $Tz_n$, such that $Tc_n = Tz_{n-1} + \delta T_{n-1}$, wherein $\delta T_{n-1}$ represents a time period proportional to the time interval between consecutive BEMF zero-crossings in the windings in states n−1 and n, and
   each $Tz_n$ substantially coincides with a signal from the commutation phase generator indicating a corresponding BEMF zero-crossing in a winding.

52. The method of claim 51, wherein step (b) further comprises the steps of:
   in each commutation state n:
   electrically floating the selected first winding at about $Tc_n$ to detect BEMF zero-crossing in that selected winding at about $Tz_n$, and
   upon detecting said BEMF zero-crossing, during at least a portion of the time period $\delta T_n$ shorting the first winding and a second winding to generate a retarding force against the spindle motor and to direct power generated by at least the third winding to the voice coil for moving the actuator arm to a latched position.

53. The method of claim 43, wherein each winding has a first terminal and a second terminal, wherein the first terminals of the windings are connected together at a center tap.

54. A method of parking a read/write head for a head and disk assembly having a data disk rotatably attached to a multi-phase wound spindle motor having multiple windings, comprising the steps of:

generating a set of sequential signals in response to voltages in the spindle motor windings;

in response to the sequential signals, dynamically sequencing:

shorting a first winding and a second winding of the spindle motor together to generate a retarding force against the spindle motor;

directing power generated from a third winding to a voice coil; and retracting the read/write head to a parked position.

55. The method of claim 54, wherein the step of shorting a first winding and a second winding includes the step of shorting the first winding and the second winding of the spindle motor together in parallel.

56. The method of claim 54, wherein the first winding, the second winding, and the third winding of the spindle motor includes a first MOSFET switch, a second MOSFET switch, and a third MOSFET switch, respectively, and the step of shorting a first winding and a second winding of the spindle motor together includes the step of activating the first MOSFET switch and the second MOSFET switch.

57. The method of claim 56, wherein the step of directing power generated from a third winding includes the step of activating the third MOSFET switch to couple the third winding to the voice coil.

58. The method of claim 57 wherein the disk assembly further comprises a spindle motor controller and wherein the step of directing power generated from a third winding includes the step of directing power to the spindle motor controller.

59. The method of claim 54 wherein the disk assembly further comprises an aerodynamic latch body disposed above the data disk and wherein the step of retracting the read/write head to a parked position includes the step of latching the read/write head in the parked position.

60. The method of claim 54 further comprising the step of isolating supply power from the spindle motor during a power interruption.

61. The method of claim 54, further comprising the steps of:

shorting the first winding and the second winding in parallel, providing a parallel combination of the first and second windings to produce the retarding force; and electrically coupling the third winding between the voice coil and said parallel combination of the first and second windings, to direct power produced by the third winding with parallel combination of first and second windings, to the voice coil retracting the read/write head to a parked position.

62. The method of claim 54, wherein the spindle motor comprises a Y-winding having three windings.

* * * * *